(12) United States Patent
Chung

(10) Patent No.: US 12,085,210 B2
(45) Date of Patent: Sep. 10, 2024

(54) AIRCRAFT TAIL LOCK

(71) Applicant: Sierra Nevada Corporation, Sparks, NV (US)

(72) Inventor: Hoang Minh Chung, Jurong (SG)

(73) Assignee: Sierra Nevada Company, LLC, Sparks, NV (US)

( * ) Notice: Subject to any disclaimer, the term of this patent is extended or adjusted under 35 U.S.C. 154(b) by 914 days.

(21) Appl. No.: 17/147,437

(22) Filed: Jan. 12, 2021

(65) Prior Publication Data

US 2021/0222809 A1 Jul. 22, 2021

Related U.S. Application Data

(60) Provisional application No. 62/962,778, filed on Jan. 17, 2020.

(51) Int. Cl.
*F16L 37/248* (2006.01)
*B64C 1/26* (2006.01)
*F16L 37/252* (2006.01)

(52) U.S. Cl.
CPC .............. *F16L 37/248* (2013.01); *B64C 1/26* (2013.01); *F16L 37/252* (2013.01)

(58) Field of Classification Search
CPC ......... B64U 30/14; B64C 1/26; F16L 37/248; F16L 37/252; H01R 13/6456
USPC ........................................ 439/314, 680, 681
See application file for complete search history.

(56) References Cited

U.S. PATENT DOCUMENTS

| | | | | |
|---|---|---|---|---|
| 1,022,759 | A * | 4/1912 | Stine et al. ........... | F16L 37/252 285/361 |
| 4,306,743 | A * | 12/1981 | Hinshaw ............... | F16L 37/248 285/260 |
| 4,477,022 | A * | 10/1984 | Shuey .................. | H01R 13/422 439/314 |
| 4,483,579 | A * | 11/1984 | Derr ..................... | H01R 13/625 439/317 |
| 4,801,277 | A * | 1/1989 | Seilhan ................. | H01R 13/64 439/597 |
| 5,707,152 | A * | 1/1998 | Krywitsky ............ | F16L 19/025 374/208 |
| 6,226,068 | B1 * | 5/2001 | Arcykiewicz ........ | H01R 13/625 439/314 |
| 6,902,211 | B2 * | 6/2005 | Wirth, Jr. ............... | A47L 9/242 285/402 |
| 7,632,126 | B1 * | 12/2009 | Farole .................. | H01R 12/724 439/314 |
| 7,666,028 | B2 * | 2/2010 | Meleck .............. | H01R 13/6272 439/502 |
| 7,892,042 | B2 * | 2/2011 | Spicer .................. | H01R 13/645 439/680 |

(Continued)

*Primary Examiner* — Marcus E Harcum
(74) *Attorney, Agent, or Firm* — Mintz Levin Cohn Ferris Glovsky and Popeo, P.C.

(57) ABSTRACT

Systems, devices, and methods are provided for a locking apparatus. A locking apparatus can be configured to operably attach a fixed-wing of an aircraft to a body of the aircraft. The locking apparatus can include a first connector configured to releasably receive a first tube, a second connector having a first side and second side, the first side configured to receive a second tube and the second side configured to releasably receive the first connector, and an end coupling cap configured to releasably lock the first connector and second connector together.

43 Claims, 13 Drawing Sheets

(56) References Cited

U.S. PATENT DOCUMENTS

| | | | | |
|---|---|---|---|---|
| 7,950,944 B1* | 5/2011 | Hertzler | H01R 13/625 | 439/314 |
| 7,988,479 B2* | 8/2011 | Hankins | H01R 13/625 | 439/314 |
| RE42,926 E* | 11/2011 | Norwood | H01R 13/641 | 439/314 |
| 8,998,631 B2* | 4/2015 | Gorman | H01R 13/17 | 439/314 |
| 10,668,265 B2* | 6/2020 | Burdge | F16L 37/35 | |
| 11,460,137 B2* | 10/2022 | Vinson | F16L 37/252 | |
| 11,603,953 B2* | 3/2023 | Sorkin | F16L 13/116 | |
| 2004/0033711 A1* | 2/2004 | Loveless | H01R 24/50 | 439/314 |
| 2005/0059284 A1* | 3/2005 | Thurston | H01R 13/623 | 439/314 |
| 2006/0046578 A1* | 3/2006 | Karadimas | H01R 13/6456 | 439/680 |
| 2007/0037430 A1* | 2/2007 | Evans | H01R 13/635 | 439/314 |
| 2009/0067916 A1* | 3/2009 | Busse | G01D 11/30 | 439/314 |
| 2014/0335739 A1* | 11/2014 | Sato | H01R 13/641 | 439/680 |
| 2015/0053843 A1* | 2/2015 | Tayne | F16B 43/003 | 248/678 |
| 2015/0222050 A1* | 8/2015 | Behning | H01R 13/6456 | 439/314 |
| 2015/0354742 A1* | 12/2015 | Holtby | F16L 21/08 | 285/308 |
| 2018/0118336 A1* | 5/2018 | Drennan | B64C 3/32 | |
| 2018/0128407 A1* | 5/2018 | Neal | F16L 37/252 | |
| 2018/0312252 A1* | 11/2018 | Yates | B64U 20/70 | |
| 2019/0135424 A1* | 5/2019 | Baity | B64U 10/14 | |
| 2019/0203864 A1* | 7/2019 | Deneke | F01N 13/1811 | |
| 2019/0248469 A1* | 8/2019 | Hefner | B64C 39/024 | |
| 2020/0172236 A1* | 6/2020 | George | B64D 9/00 | |
| 2021/0197965 A1* | 7/2021 | Kunz | B64C 39/024 | |
| 2023/0143867 A1* | 5/2023 | Matsui | F16L 37/248 | 285/361 |

* cited by examiner

AIRCRAFT TAIL LOCK

CROSS-REFERENCE TO RELATED APPLICATIONS

This application claims the benefit of U.S. Provisional Application No. 62/962,778, filed Jan. 17, 2020, which is hereby incorporated by reference in its entirety.

BACKGROUND

An unmanned vehicle is a vehicle capable of travel without a physically-present human operator. An unmanned vehicle may operate in a remote-control mode, in an autonomous mode, or in a partially autonomous mode. Unmanned aerial vehicles ("UAVs"), such as drones, are used in a wide variety of applications. For example, drones may be used to transport material or goods from one location to another.

Drone aircraft are typically one of two types. A first type is a fixed-wing design, where lift is provided by one or more fixed wings and forward thrust is provided by a spinning propeller, ducted fan, or jet engine. A second type is a helicopter-type design where lift and forward thrust are provided by one or more vertically oriented rotors or rotary wings. Included in this second type is the so-called 'quadcopter' design which incorporates four vertical rotors. Manipulation of the relative thrust provided by each of the four rotors provides for variable vertical thrust and forward and lateral movement. Fixed-wing aircraft of the first type are generally efficient in long distance transportation. The various multicopter designs of the second type are generally less efficient but have the unique ability to take off vertically. These aircraft designs are said to be capable of vertical take-off and landing, or VTOL.

Drone aircrafts that are capable of both long distance travel and VTOL can greatly benefit modern drone capabilities. Improvements in designing, assembling, and operating such drones can also benefit the effectiveness and efficiency of modern drone systems.

BRIEF SUMMARY

The present disclosure relates generally to systems and methods for a locking apparatus for components of an aircraft. In one aspect, a locking apparatus can include a first connector configured to releasably receive a first tube, a second connector having a first side and second side, the first side configured to receive a second tube and the second side configured to releasably receive the first connector, and an end coupling cap configured to releasably lock the first connector and second connector together. In one aspect, the first connector can include a shaft, having an inner diameter and outer diameter, and an annular flange. In one aspect, the annular flange of the first connector can have an outer diameter larger than that of the outer diameter of the shaft, the annular flange configured to secure the end coupling cap to the first connector from sliding beyond a desired position. In one aspect, the first side of the second connector can include a first shaft and the second side of the second connector includes a second shaft, the inner diameter of the first shaft can be smaller than that of the inner diameter of the second shaft, the outer diameter of the first shaft can be smaller than that of the outer diameter of the second shaft. In one aspect, the outer diameter of the first shaft can be equal to or smaller than that of the inner diameter of the second shaft. In one example, the second connector can include an annular flange separating the first side and second side of the second connector, the annular flange having an outer diameter larger than that of outer diameters of the first side and second side of the second connector. In one example, the annular flange can be configured to secure the end coupling cap to the second connector from sliding beyond a desired position when in a locked position. In one aspect, the end coupling cap can include a hollow body with an inner diameter, the inner diameter equal in length to an outer diameter of the second side of the second connector, such that when the locking apparatus can be in a locked position, the second connector can receive the first connector and the end coupling cap can secure the first connector and the second connector with the end coupling cap. In one aspect, the end coupling cap can include an annular inner lip at one end of the hollow body, the annular inner lip configured to secure the end coupling cap in a desired position when locking the first connector and second connector. In one aspect, the end coupling cap can prevent from sliding along a longitudinal axis beyond a locking position when locking the first connector and second connector when the lip is in secure contact with an annular flange of the first connector and an opposite end to the lip of the hollow body is in secure contact with an annular flange of the second connector. In one aspect, the end coupling cap can include a rotating lock connection. In one aspect, the rotating lock connection can include a cutout in the end coupling cap such that a lock pin protruding from an outer surface of the second connector can slide through a first portion of the cutout, can rotate about the end coupling cap along a second portion of the cutout, and can releasably secure the lock pin with in a groove configured to receive the lock pin. In one aspect, the end coupling cap can be configured to allow a rotation of 30 to 90 degrees relative to the first and second connector. In one aspect, the end coupling cap can include a magnetized holding pin configured to receive and releasably secure the lock pin.

In one aspect, the locking apparatus can include an electrical connection including a first PCB tray configured to releasably secure a first PCB and a first electrical connector, a second PCB tray configured to releasably secure a second PCB and second electrical connector, the first electrical connector operably can be connected to the second electrical connector when the locking apparatus is configured in a locking position. In one aspect, the first PCB tray can be releasably secured to the first connector and the second PCB tray can be releasably secured to the second connector. In one aspect, one or more fasteners can secure the first PCB tray, the first connector, and the first tube together.

In one aspect, the locking apparatus can lock a wing to a body of an aircraft. In one aspect, the first tube can be operably connected to a body of an aircraft and the second tube can be operably connected to a tail flap of the aircraft and the locking apparatus can lock the body of the aircraft to the tail flap. In one aspect, the first tube and second tube can include carbon fiber. In one aspect, the first tube can be configured to rotate such that the tail flap can also rotate about a longitudinal axis of the first tube and second tube. In one aspect, each of the first connector, second connector, and end coupling cap can include anodized aluminum. In one aspect, the lock pin can be comprised of hardened steel.

Other embodiments are directed to systems and computer readable media associated with methods described herein.

A better understanding of the nature and advantages of embodiments of the present invention may be gained with reference to the following detailed description and the accompanying drawings.

DETAILED DESCRIPTION

Figure 1A:
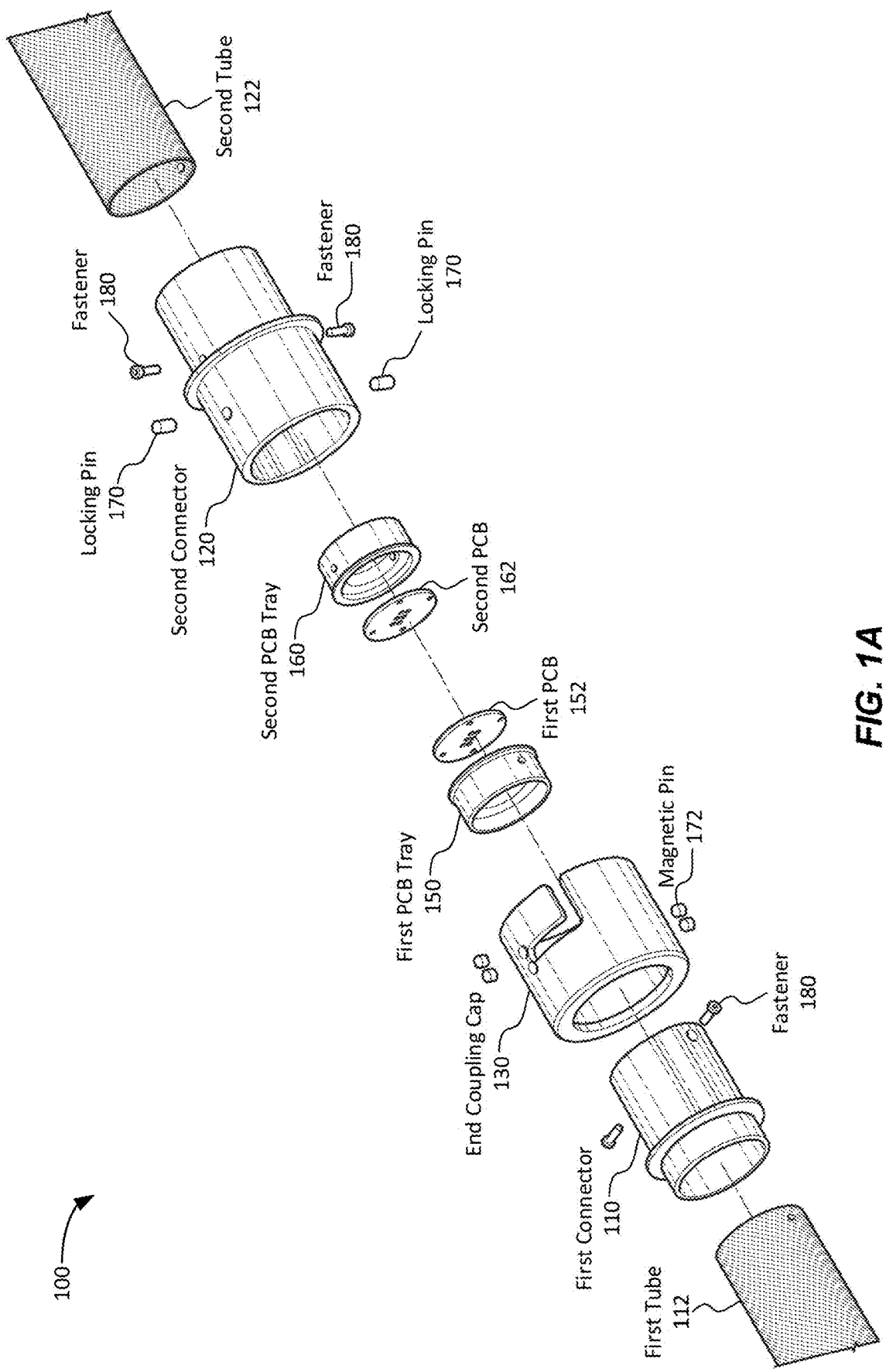
FIGS. 1A-1E illustrate an aircraft tail lock assembly in accordance with various aspects of the subject technology.

In this specification, reference is made in detail to specific examples of the disclosure. Some of the examples or their aspects are illustrated in the drawings.

For clarity in explanation, the disclosure has been described with reference to specific examples, however it should be understood that the disclosure is not limited to the described examples. On the contrary, the disclosure covers alternatives, modifications, and equivalents as may be included within its scope as defined by any patent claims. The following examples of the disclosure are set forth without any loss of generality to, and without imposing limitations on, the claimed disclosure. In the following description, specific details are set forth in order to provide a thorough understanding of the present disclosure. The present disclosure may be practiced without some or all of these specific details. In addition, well known features may not have been described in detail to avoid unnecessarily obscuring the disclosure.

In addition, it should be understood that steps of the exemplary methods set forth in this exemplary patent can be performed in different orders than the order presented in this specification. Furthermore, some steps of the exemplary methods may be performed in parallel rather than being performed sequentially.

A locking mechanism for attaching a wing or fixed-wing of an aircraft is described below. For example, an aircraft locking apparatus for attaching a tail wing or fixed-wing of a VTOL aircraft to an aircraft boom assembly is discussed below. The locking apparatus can be configured to securely attach a tail wing to a boom of a drone aircraft, capable of long distance travel under operation, and configured to be removed from the boom with a quick release mechanism of the aircraft locking apparatus.

In one example, an aircraft, such as a drone or unmanned aerial vehicle (UAV) is described having a fuselage, one or more wings, one or more booms or boom assemblies. The one or more wings can span across a fuselage of the drone and a pair of booms can be attached to the each side of two sides of the one or more wings such that one boom is on one side of the fuselage and another boom is on another side of the fuselage, connected to the fuselage through the wing. In this example, the vertical takeoff propellers can be mounted onto the pair of booms.

In one example application, the aircraft described above can be light weight and having modular components. For example, an assembled drone can include various modular components such as a fuselage or body, a wing including a main wing, one or more tail wings including a vertical tail wing, diagonal tail wing, horizontal tail wing, or a combination thereof, one or more booms, propellers, rotors, engines, battery, computer hardware, cables and wiring, sensors, etc. In one example, an assembled drone can receive multiple configurations of components that are all designed to fit the drone assembly. For example, an aircraft manufacturing organization can manufacture different designs of a wing or mass manufacture the same design wing, or both, and each wing manufacture can be fitted onto the aircraft. The ability for modular components used for assembling a drone and the ability to swap out one component, with another can greatly increase the productivity, quality, efficiency, time, labor, of operating and storing an aircraft or fleet of aircraft for commercial purposes.

In such a case, the difference between being able to assemble a modular drone from hours to minutes or from multiple human operators to a single human operator for the whole assembly or portions of the assembly can drastically affect the effectiveness of aircraft fleet operation. For example, a two person job of assembling an aircraft being cut down to one person in a similar range of time required with the same resulting aircraft assembly. Or a portion of assembling a drone that typically takes in the magnitude of tens of minutes or hours to seconds or minutes. Having these improvements, when applied to a fleet of hundreds or thousands of aircrafts, each having swappable and modular components, can greatly improve a fleet's operations.

In one example, the aircraft can also include a tail wing, tail flap, tail fin, or a plurality of modular tail wings such as a vertical tail wing, diagonal tail wing, horizontal tail wing, or a combination thereof. In this example, one tail wing can be configured to connect to a rear side of the boom. An aircraft with a pair of booms can be configured with a pair of tail wings, such that one tail wing connects to the rear side of one boom and the other tail wing connects to the rear side of the other boom. In one example, the tail wing can be operably connected to a tube extending outward from a leading edge of the tail wing along one end side of the wing. The boom can include or can be operably connected to a second tube extending outwardly from the rear side of the boom, extending along an axis of the length of the boom. In this example, the tube of the tail wing and the tube of the boom can be linked, effectively connecting the tail wing to the boom. The tube of the tail wing and the tube of the boom can be linked and securely locked with each other with a locking apparatus. The locking apparatus can be a quick release mechanism such that an aircraft assembly operator can easily assemble any and all of the tail wings of the drone to any and all of the booms of the drone and the tail wing will be secured to the boom of the drone during operation including long range flight.

A. Tail Locking Apparatus

FIGS. 1A-1E illustrate an aircraft tail locking assembly for connecting a first portion of an aircraft and a second portion of an aircraft. FIG. 1A illustrates an exploded view of an example locking apparatus for a portion of an aircraft, such as a drone, or UAV. As illustrated in FIG. 1A, a locking apparatus 100 includes a first connector 110, a second connector 120, and a end coupling cap 130. The first connector 110 can be configured to connect a first tube 112. In one example, the first connector 110 can be configured to releasably receive the first tube 112. The second connector 120 can be configured to connect the second tube 122. In one example, the second connector 120 includes a first side and a second side. The first side can be configured to receive the second tube 122. The second side of the second connector 120 can also be configured to releasably receive the first connector 110. The end coupling cap 130 can be configured to releasably lock and unlock the first connector 110 and the second connector 120 together.

In one example, the first tube 112 can be received by the first connector 110 and secured with a pair of fasteners 180. The fasteners can be threaded fasteners. In another example, the fasteners can be magnetic fasteners, screwed on fasteners, rivets, or bolts. In another example, the fasteners can be made of carbon fiber, carbon composite compound, plastic, metal, or ceramic. In this example, the first connector 110 includes a hollow interior with an inner diameter and outer diameter, an outer diameter of the first tube 112 being the same length as that of the inner diameter of first connector 110. When locked by the fasteners 180, the first tube 112 and first connector 110 are secured to each other such that the first tube 112 cannot continue to move through, or slide through, the first connector 110, the first tube 112 does not rotate relative to the first connector 110. One end of first tube 112, when inserted and received by the first connector 110 and secured by the pair of fasteners 180, is flush against one end of the first connector 110. In one example, another end of the first tube 112 can include or support a tail wing of an aircraft.

In one example, the second tube 122 can be received by the second connector 120 and secured with a pair of fasteners 180. In this example, the second connector 122 has a hollow cylindrical shape. The second connector 122 has a first side and second side. The first side and second side of the second connector 120 can each have an inner diameter and an outer diameter. In this example, the inner diameter of the first side of the second connector 120 can be configured to releasably receive the second tube 122. An outer diameter of the second tube 122 can be the same length as that of the inner diameter of the first side of the second connector 120. The second tube 122 and second connector 120 can be connected to each other and secured by a pair of fasteners 180. In this is example, when locked by the fasteners 180, the second tube 122 and the second connector 120 are secured to each other such that the second tube 122 cannot continue to move through, or slide through or retract away from, the second connector 120, and the second tube 122 cannot rotate relative to the second connector 120. On one end of the second tube 122, when inserted and received by the first side of the second connector 120 and secured by the pair of fasteners 180, is flush against a cross section of the second connector 120 where the first side of the second connector 120 meets the second side of the second connector 120. In one example, another end of the second tube 122 can include, support, or be supported by a boom or boom assembly of an aircraft. The locking apparatus 100 locks a wing, such as the tail wing, or tail flap, to a body of the aircraft through a boom of the aircraft, and the locking apparatus 100.

In one example, the inner diameter of the second side of the second connector 120 is equal to the outer diameter of the first connector 110. When the second connector receives 120 receives the first connector 110, a portion of a body of the first connector 110 is inserted into the second side of the second connector 120. The first and second connector can be secured with a pair of locking pins 170. The pins can be inserted through a pair of small holes on opposite ends of the second side of the second connector 120 and through a pair of small holes on opposite ends of the first connector 110. When the locking pins 170 placed in the pair of small holes, the first connector 110 and second connector are mechanically locked to each other, such that one connector cannot slide through, or away, from the other connector and that one connector cannot rotate relative to the other connector. In this example, under operation of the aircraft, the tail wing will be operably connected to the boom of the aircraft and locked in a fixed position under flight. In this example, the longitudinal axis, or axis of the length, of the second tube 122 and first tube 112 are effectively lined up. The first tube 112 can be operably connected to the second tube 122, and both tubes can be operably connected to a body of the aircraft. The second tube 122 can also be operably connected to the tail wing, or tail flap of the aircraft. Thus, under operation, the body of the aircraft and tail flap of the aircraft are effectively locked to each other by the locking apparatus 100. If the second tube 122 turns or rotates about the axis of the second tube 122's length, the tail wing will also turn or rotate about the axis of the first tube 122 and would be the same amount as that of the second tube 122.

In one example, when secured, a portion of the pair of locking pins 170 will be inserted through the second connector and into the first connector and another portion of the pair of locking pins 170 will be protruding radially from the second connector 120, to be engaged by the end coupling cap 130.

The end coupling cap 130 is a cylindrical shape and can include a hollow body with an inner diameter and outer diameter. The inner diameter can be equal in length to the outer diameter of the second side of the second connector 120, such that when the locking apparatus 100 is in a locked position, the second connector 120 receives the first connector 110, and the end coupling cap 130 secures the first connector 110 and the second connector 120 with the end coupling cap 130. In this example, the end coupling cap can include a cutout such that one or more magnetic pins 172 can be located at an end section of the cutout. When the end coupling cap engages the first connector 110 and second connector 120, the locking pin 170 will engage the cutout as the end coupling cap 130 slides through the first connector 110 and second connector 120. Once the end coupling cap 130 slides through the first connector 110 and second connector 120, the end coupling cap 130 will eventually reach a stop as a portion of the first connector 110 and a portion of the second connector 120 will block the end coupling cap from sliding further. In this configuration, the end coupling cap will have secured the first connector 110 and second connector 120 from sliding away from each other and the end coupling cap 130. The end coupling cap 130 can then be rotate about its longitudinal axis, or axis of its length, such that the locking pins 170 will each engage the magnetic pins 172 to secure and lock each of the first connector 110, second connector 120, and end coupling cap 130 to each other. The locking apparatus can be easily disassembled, effectively separating a tail wing and a boom of the aircraft from each other, by rotating the end coupling cap 130 in the opposite direction that allowed the locking pins 170 to engage and magnetically lock to the magnetic pins 172.

In one example, electrical connections, such as cables, wiring, and electrical components can be installed and connected between the boom and the tail wing or between the boom and any other component of the aircraft. For example, one or more motors, one or more lights, or a combination thereof, can be part of the tail wing. The electrical connection that powers and controls the motors and lights of the tail wing will be electrically connected through the boom. Assembling the electrical connections are usually done before fully mounting and sealing one component with another so that electrical components or wires are not exposed on the outside during flight and that electrical components and wires are protected by the body of each component. In this example, each electrical component, such as PCB's, and the wiring that connects the electrical components a sealed by the locking apparatus and further wiring can be housed within the first and second tube.

For example, one or more motors, one or more lights, or a combination thereof, can be part of the tail wing. The electrical connection that powers and controls the motors and lights of the tail wing will be electrically connected through the boom. Each electrical component, such as PCB's, and the wiring that connects the electrical components a sealed by the locking apparatus and further wiring can be housed within the first and second tube.

In one example, as illustrated in FIG. 1A, a first printed circuit board (PCB) 152, configured as a connection interface of electrical components of a wing of an aircraft can be connected to a second PCB 162, configured as a connection interface of electrical components and power of the body of the aircraft. In this example power, control, and other signals can be sent and received electrical components of the body of the aircraft to electrical components embedded or located near the tail wing by electrically coupling the first PCB 152 to the second PCB 162. In this example, the first PCB 152 can be secured on a first PCB tray 150 and the second PCB 162 can be secured on a second PCB tray 160. The first PCB tray 150 can also be received and secured to the first connector 110 and fastened to the first connector and first tube 112 by the pair of fasteners 180 that secures the first tube 112 to the first connector 110. In this configuration, each of the first PCB 152, first PCB tray 150, first connector 110, and first tube 112 will be secured to each other such that the components cannot rotate relative to each other. This configuration ensures that as the aircraft is under operation, the wiring that connects the first PCB 152 to electrical components of the tail wing do not rotate, loosen, mix up or clutter. The second PCB tray 160 can also be received and secured to the second connector 120 and fastened to the second connector 120 and second tube 122 by the pair of fasteners 180 that secures the second tube 122 to the second connector 120. In this configuration, each of the second PCB 162, second PCB tray 160, second connector 120, and second tube 122 will be secured to each other such that the components cannot rotate relative to each other. This configuration ensures that as the aircraft is under operation, the wiring that connects the second PCB 162 to electrical components of the boom and rest of the body of the aircraft do not rotate, loosen, mix up or clutter. In this example, the first tube can be configured to rotate as the second tube 122 rotates, thus also rotating the tail wing or tail flap about a longitudinal axis.

Figure 1B:
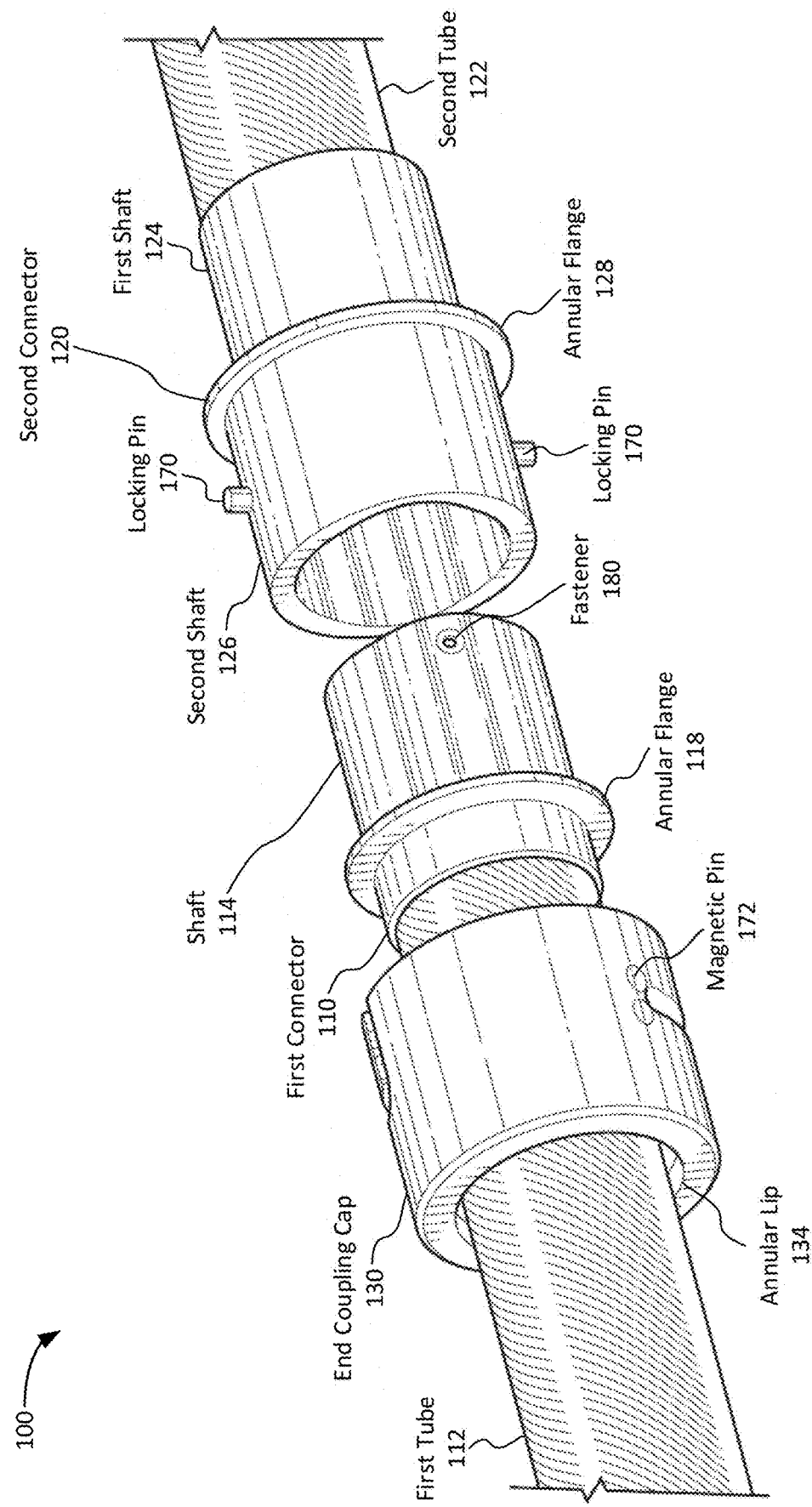
Figure 1C:
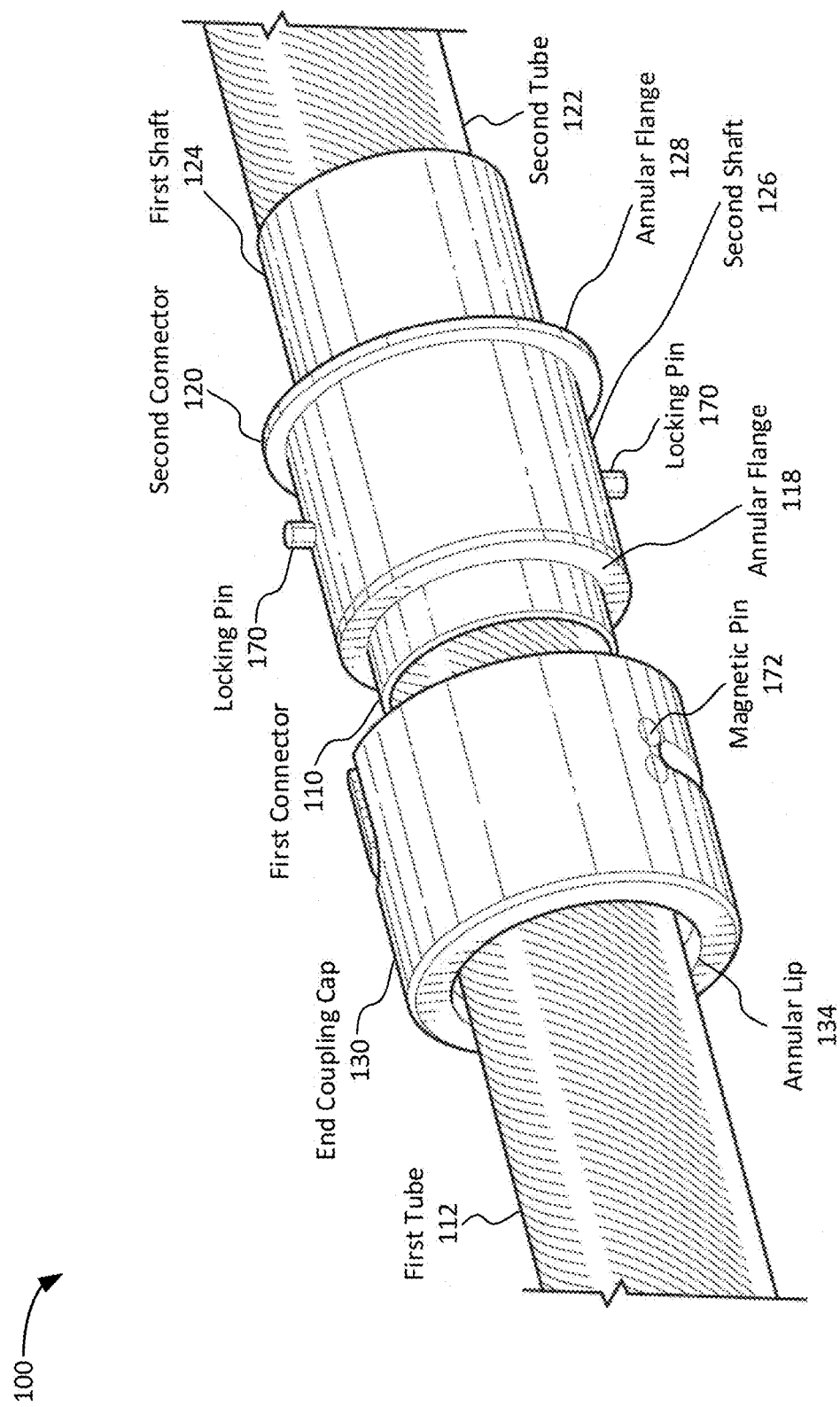

FIGS. 1B-1E illustrate the locking apparatus 100 under operation as components of the locking apparatus 100 are connected to each other. As illustrated in FIG. 1B, the first connector 110 can include a shaft 114, the shaft 114 having an inner diameter and outer diameter. The first connector 110 can also include an annular flange 118. The annular flange 118 is configured to secure the first connector 110 with the second connector 120. The first tube 112 can be received by the first connector 110 and secured with a pair of fasteners 180. When locked by the fasteners 180, the first tube 112 and first connector 110 are secured to each other such that the first tube 112 cannot continue to move through, or slide through, the first connector 110, and that the first tube 112 does not rotate relative to the first connector 110. One end of first tube 112, when inserted and received by the first connector 110 and secured by the pair of fasteners 180, is flush against one end of the first connector 110. In one example, another end of the first tube 112 can include or support a tail wing of an aircraft. In one example, the annular flange 118 of the first connector 110 has an outer diameter larger than that of the outer diameter of the shaft 114. As illustrated in FIG. 1C, the annular flange 118 can be configured to secure the first connector to the second connector from sliding beyond a desired position.

Figure 1D:
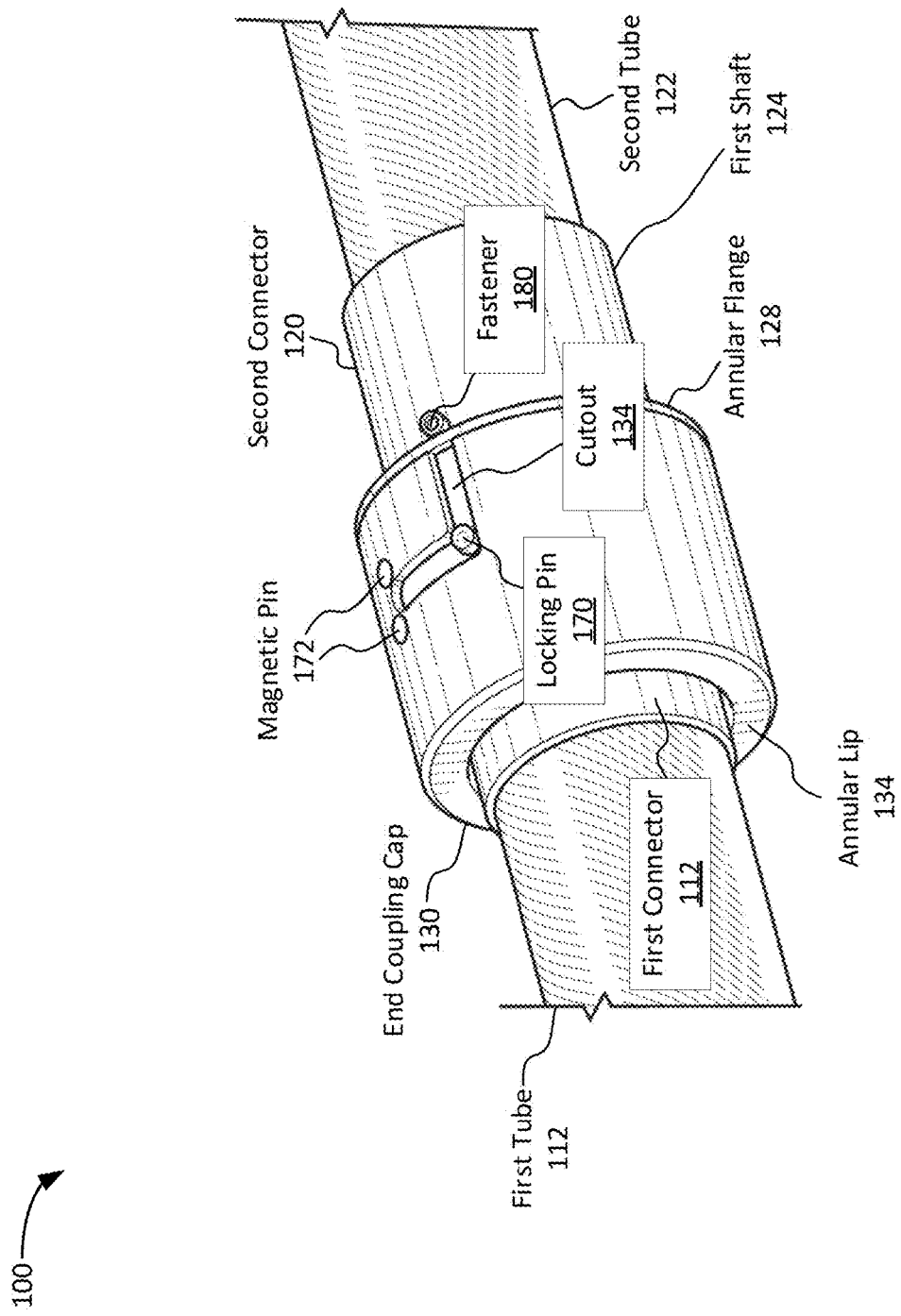

In one example, the second tube 122 can be received by the second connector 120 and secured with a pair of fasteners 180. In this example, the second connector 122 has a hollow cylindrical shape. The first side of the second connector 120 includes a first shaft 124 and the second side of the second connector 120 includes a second shaft 126. In this example, each of the first shaft 124 and second shaft 126 has an inner diameter and outer diameter. The inner diameter of the first shaft 124 can be smaller than that of the inner diameter of the second shaft 126, and the outer diameter of the first shaft 124 can be smaller than that of the outer diameter of the second shaft 126. In one example, the outer diameter of the first shaft 124 can be equal to or smaller than that of the inner diameter of the second shaft. The second connector 120 can also include an annular flange 128 configured to engage the end coupling cap 130 when the locking apparatus 100 is configured in a locking position. In one example, the annular flange 128 separates the first side and second side of the second connector 120. The annular flange 128 can have an outer diameter larger than that of the outer diameters of the first side and second side of the second connector 120. As illustrated in FIG. 1D, the annular flange 128 can be configured to secure the end coupling cap 130 to the second connector 120 from sliding beyond a desired position when the locking apparatus 100 is in a locked position.

In one example, the end coupling cap 130 is a cylindrical shape and can include a hollow body with an inner diameter and outer diameter. At one end of the hollow body of the end coupling cap 130 can include an annular lip 134, the annular lip 134 configured to secure the end coupling cap 130 in a desired position when locking the first connector 110 and second connector 120. In one example, the end coupling cap 130 can be prevented from sliding along a longitudinal axis beyond a locking position when locking the first connector 110 and second connector 120 when the annular lip 134 is in secure contact with the annular flange 118 of the first connector and an opposite end to the lip of the hollow body is in secure contact with an annular flange 128 of the second connector.

For example, as illustrated in FIG. 1B. as a first step of locking the first tube 112 and the second tube 122, the first tube 112 can first be inserted through the end coupling cap. The inner diameter of the annular lip 134 can be greater than the outer diameter of the first tube 112 and second tube 122. Once the first tube 112 is passed through the end coupling cap 130, the first tube 112 can engage the first connector 110 and locked to the first connector with a pair of fasteners 180. Additionally, the second tube 122 can be inserted in the first shaft 124 of the second connector 120 and locked with a pair of fasteners.

As illustrated in FIG. 1C, the next step can include coupling the first connector 110 with the second connector 120. When coupled, the first connector will be flush against the inner diameter of the second shaft 126. The annular flange 118 of the first connector will be engaged to one end of the second shaft 126 so that the first connector 110 will be secured in a desired position and cannot slide further into the first shaft 124 where the second tube 122 will be locked to the second connector 120. Additionally, since the hollow body of the first shaft 124 is smaller than that of the hollow body of the first connector 110, the first connector 110 will not be able to continue to slide into the second connector 120 beyond a desired position when in a locked position.

As illustrated in FIG. 1D, a next step for configuring the locking apparatus 100 in a locking position can include sliding the end coupling cap 130 back towards the second connector 120. In this configuration, the end coupling cap 130 can include a rotating lock connection including having a cutout 134. The cutout can be a right angle cutout that starts from one edge, or end, of the end coupling cap 130, the edge or end being on the opposite side of the annular lip. And the cutout 134 can include a first portion of the cutout that follows the hollow body from the end coupling cap until a certain point on the hollow body and include a second portion of the cutout 134 that follows a direction orthogonal to that of the first portion forming a right angle. At the end of the second portion of the cutout 134, the end coupling cap 130 can include one or more magnetic pins 172. In this example, as the end coupling cap 130 engages the second connector 120, the locking pin 170 secured, and partially protruding out of the second connector 120 can slide through the first portion of the cutout. The second connector 120 can continue to receive the end coupling cap 130 until the annular flange 128 engages the end side of the end coupling cap, the end side being the side opposite of the annular lip 134.

Figure 1E:
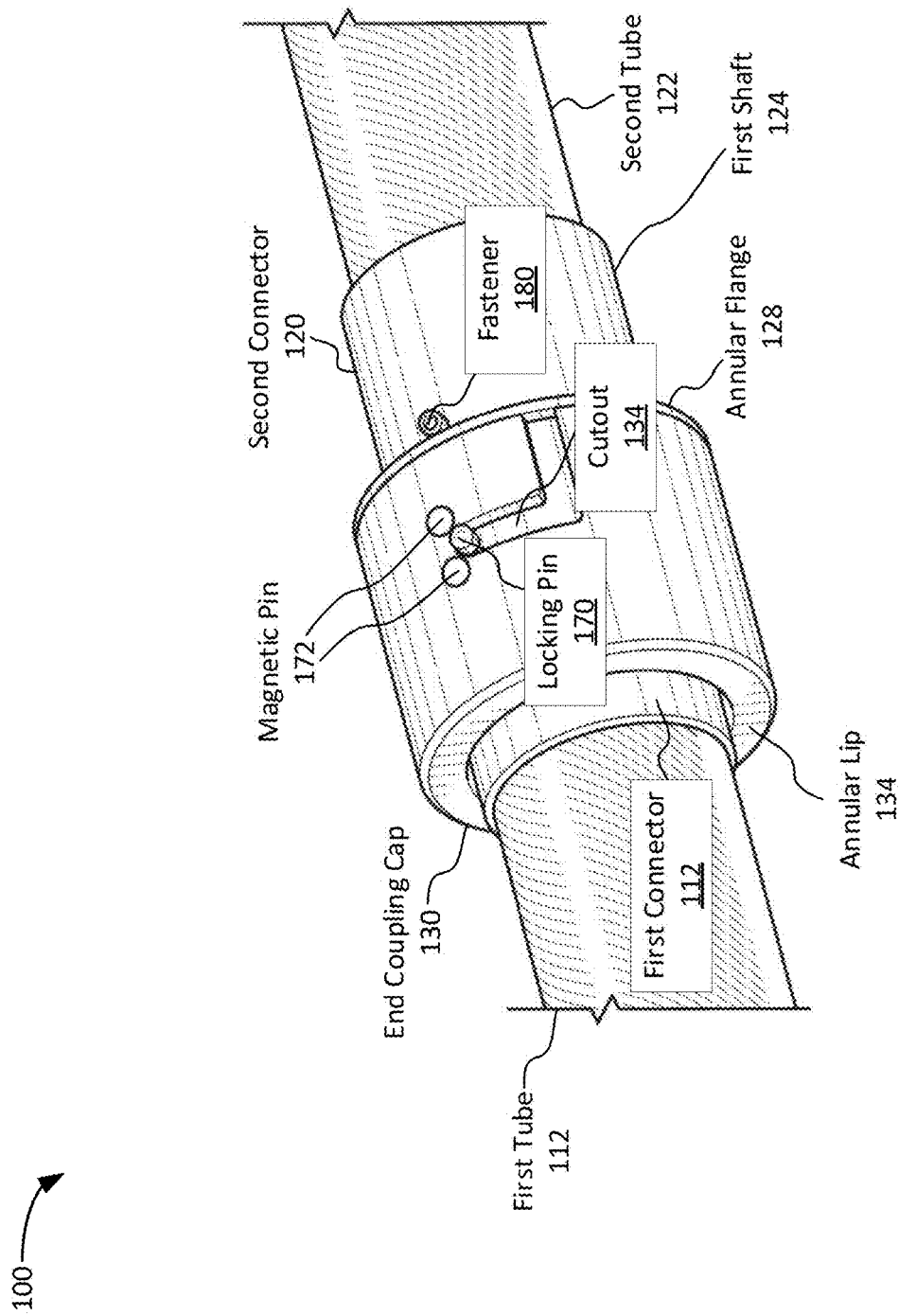

As illustrated in FIG. 1E, at this point, a user can then rotate the end coupling cap 130 such that the locking pin 170 will rotate through the end coupling cap and slide through the second portion of the cutout 134 until the locking pin 170 engages a groove at the end of the cutout 134 and is releasably secure with the groove configured to receive the locking pin. In another example, the locking pin 170 can be rotated until it magnetically couples with the magnetic pin 172. In one example, the locking pin 170 can be made of hardened steel to engage the magnetic pin 172. In another example, the locking pin 170 can be made of any type of metal or metalloid that is capable of connecting with magnets. In one example a plurality of cutouts 134, magnetic pins can be located on the hollow body of the end coupling cap 130. For example, a pair of cutouts 134 can be located on opposite sides of the surface of the hollow body of the end coupling cap 130.

In one example, the cutout 134 is configured to allow a rotation of the end coupling cap 130 when the locking pin engages the second portion of the cutout 134, of 60 degrees. In another example the amount of rotation, based on the length of the second portion of the cutout 134 can range from 30 degrees to 90 degrees. In another example, the rotation can be 1 degree to 180 degrees.

In one example, the first connector 110, second connector 120, and end coupling cap 130 can each be made of anodized aluminum material. In one example, at least a portion of the end coupling cap 130 can include plastic, configured to deform as a locking pin engages groove formed by plastic. The first tube 112 and second tube 122, can each be made of carbon fiber. The lock pin 170 can be made of hardened steel. In one example, the first tube 112 and second tube 122 can have the same diameter. In one example, the diameter of the first tube 112 and second tube 122 can be one inch in length. In another example, the diameter of the first tube 112 and second tube 122 can be 0.2 inches to 5.0 inches length.

In one example, one or more O-rings can be configured and placed on the first connector 110, second connector 120, or a combination thereof to seal the connection of electrical components disposed inside each of the first tube 112 and second tube 122. In one example, one o-ring can be wrapped around the second shaft 126 of the second connector 120 and one o-ring can be wrapped around the shaft 114 of the first connector 110.

Figure 2A:
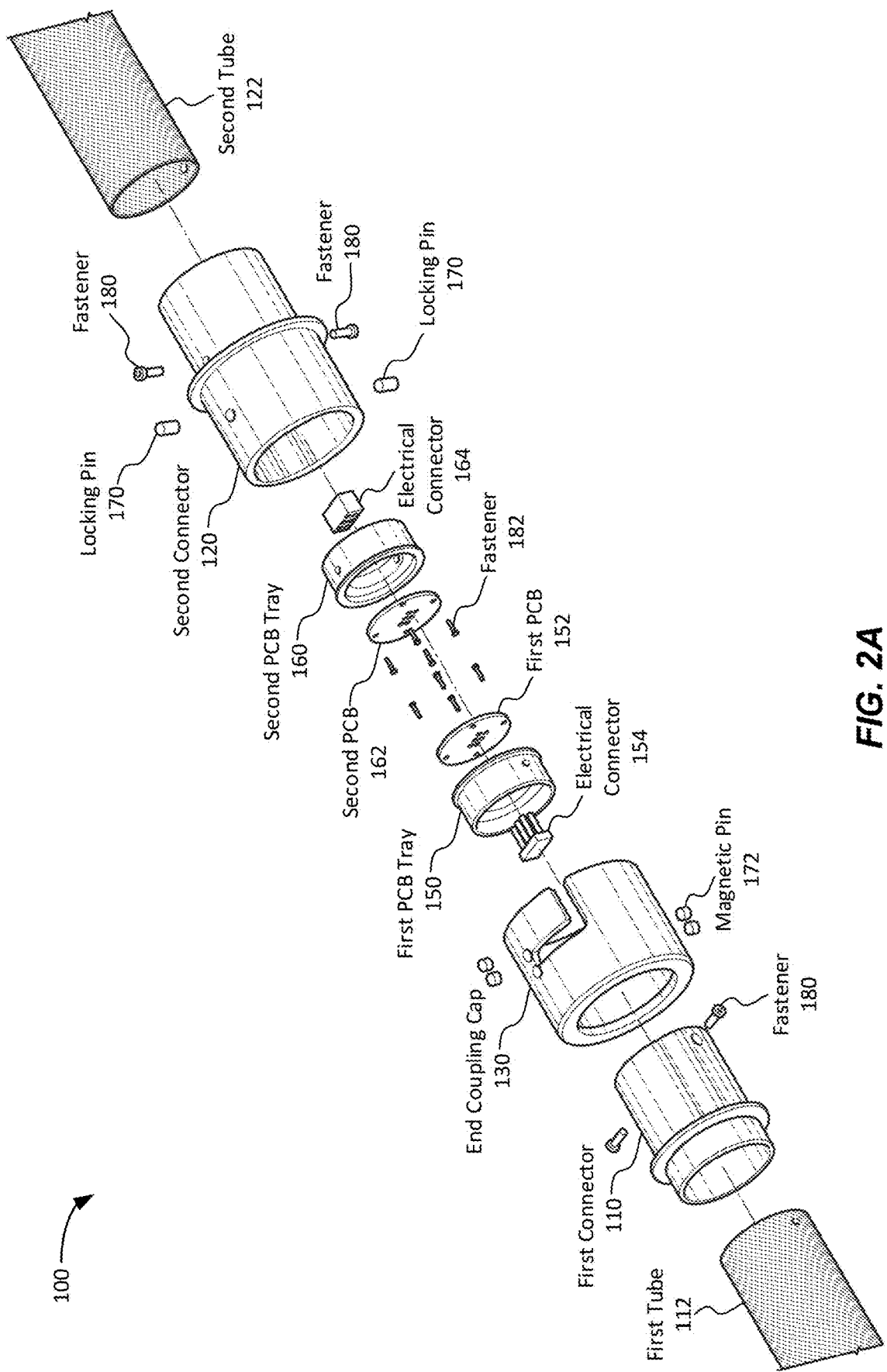
FIGS. 2A-2E illustrate an aircraft tail lock system in accordance with various aspects of the subject technology.

FIGS. 2A-2E illustrates the locking apparatus 100 including electrical connection, components, cabling, wiring, and other components to support and connect the electrical components. As illustrated in FIG. 2A, a first printed circuit board (PCB) 152, configured as a connection interface of electrical components of a wing of an aircraft can be connected to a second PCB 162, configured as a connection interface of electrical components and power of the body of the aircraft. In this example, a first PCB tray 150 is configured to releasably secure a first PCB 152 and a first electrical connector 154. A second PCB tray 160 is configured to releasably secure a second PCB 162 and second electrical connector 164, the first electrical connector 154 operably connected to the second electrical connector 164 when the locking apparatus 100 is configured in a locking position. The first PCB tray 150 can be releasably secured to the first connector 154 and the second PCB tray 160 can be releasably secured to the second connector 164. The fasteners 182 secures the first PCB tray 150, the first connector 110, and first tube 112 together.

In this example power, control, and other signals can be sent and received electrical components of the body of the aircraft to electrical components embedded or located near the tail wing by electrically coupling the first PCB 152 to the second PCB 162. In this example, the first PCB 152 can be secured on a first PCB tray 150 and the second PCB 162 can be secured on a second PCB tray 160. The first PCB tray 150 can also be received and secured to the first connector 110 and fastened to the first connector and first tube 112 by the pair of fasteners 180 that secures the first tube 112 to the first connector 110. In this configuration, each of the first PCB 152, first PCB tray 150, first connector 110, and first tube 112 will be secured to each other such that the components cannot rotate relative to each other. This configuration ensures that as the aircraft is under operation, the wiring that connects the first PCB 152 to electrical components of the tail wing do not rotate, loosen, mix up or clutter. The second PCB tray 160 can also be received and secured to the second connector 120 and fastened to the second connector 120 and second tube 122 by the pair of fasteners 180 that secures the second tube 122 to the second connector 120. In this configuration, each of the second PCB 162, second PCB tray 160, second connector 120, and second tube 122 will be secured to each other such that the components cannot rotate relative to each other. This configuration ensures that as the aircraft is under operation, the wiring that connects the second PCB 162 to electrical components of the boom and rest of the body of the aircraft do not rotate, loosen, mix up or clutter. In this example, the first tube can be configured to rotate as the second tube 122 rotates, thus also rotating the tail wing or tail flap about a longitudinal axis.

Figure 2B:
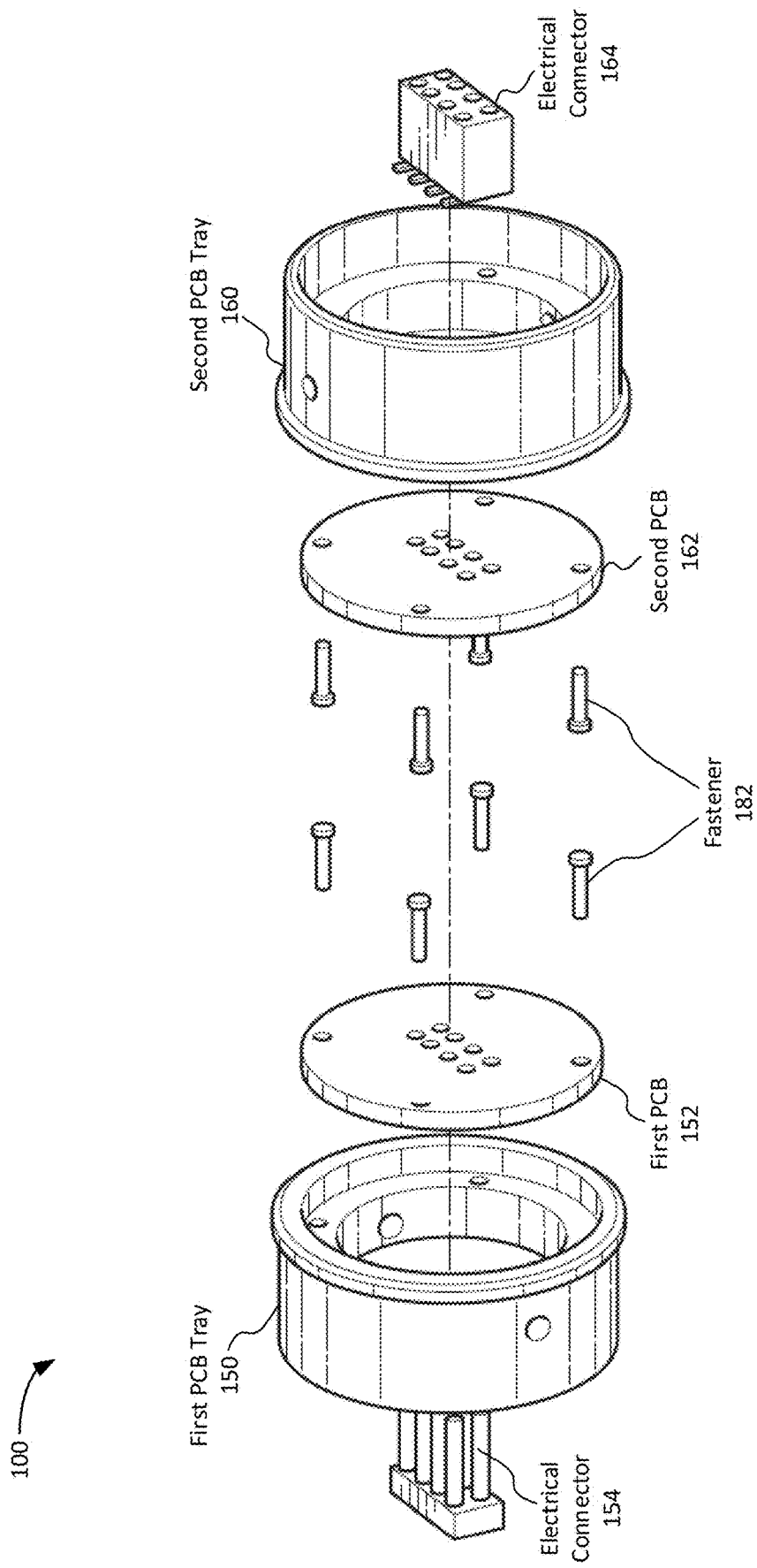

As illustrated in FIG. 2B, in one example, the first PCB 152 is connected to the electrical first PCB tray 150 by a plurality of fasteners 182, such as a plurality of screws, and the second PCB 162 is connected to the second PCB tray 160 by a plurality of fasteners 182. An electrical connector 154 connecting any electrical components supported or attached to the wing, for example a motor, light, sensor, camera, or a combination thereof, can be connected to the electrical connector 154. The electrical connector 154 can act as an electrical interface to power, control, and receive signals from the electrical components of the wing connected to the first tube 112, to the rest of the electrical components of the boom or rest of the body of the aircraft by coupling with electrical connector 164. In one example, the electrical connectors 154 and 164 can be a pair of male and female pins configured to be supported by the first PCB 152 and second PCB 162.

Figure 2C:
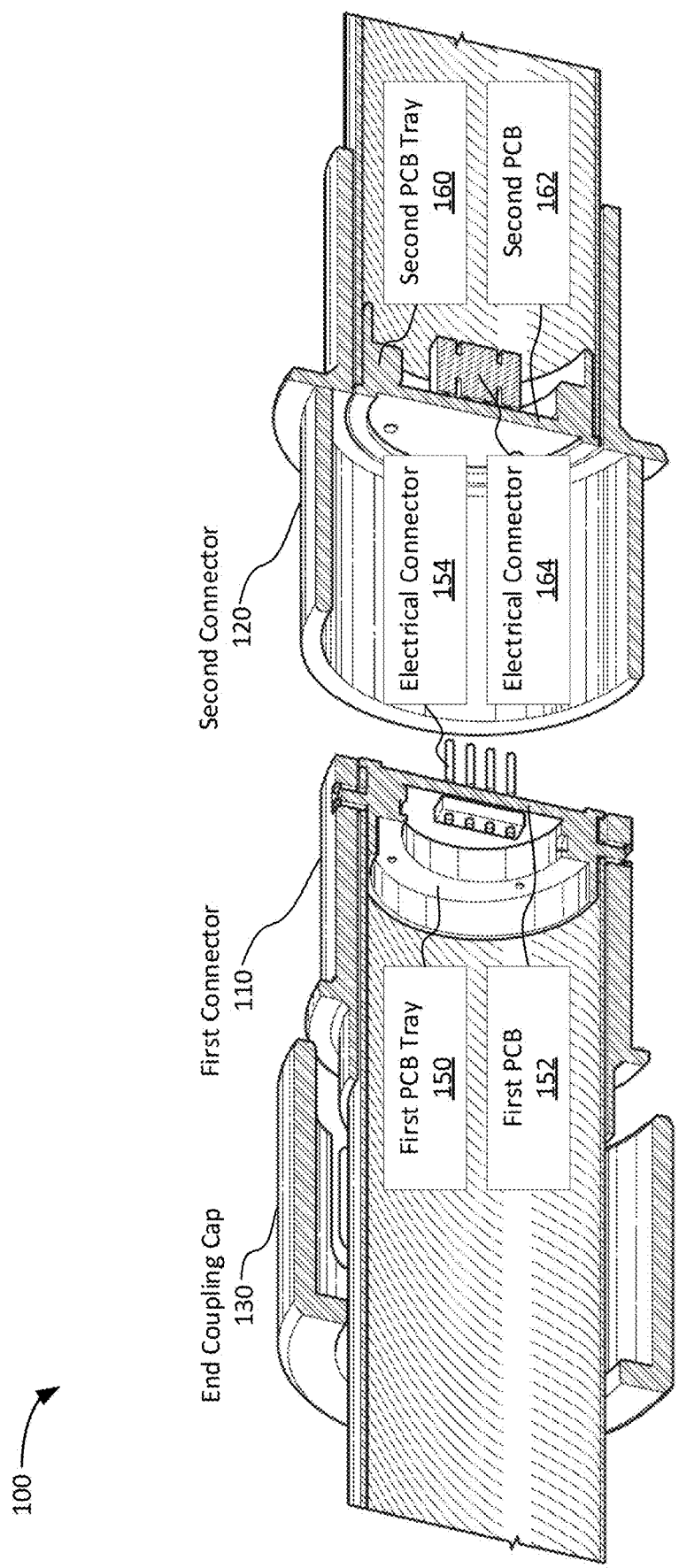
Figure 2D:
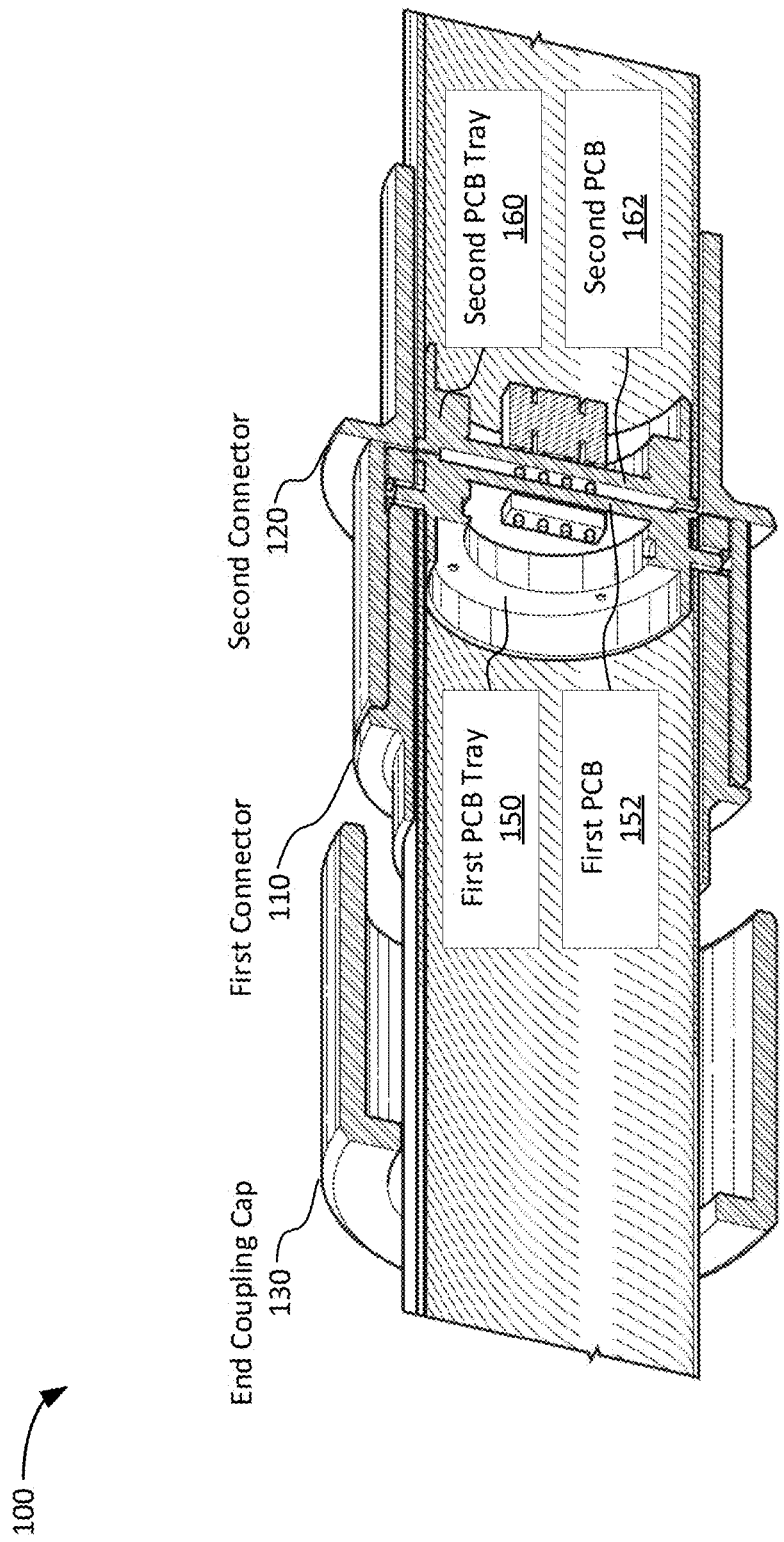
Figure 2E:
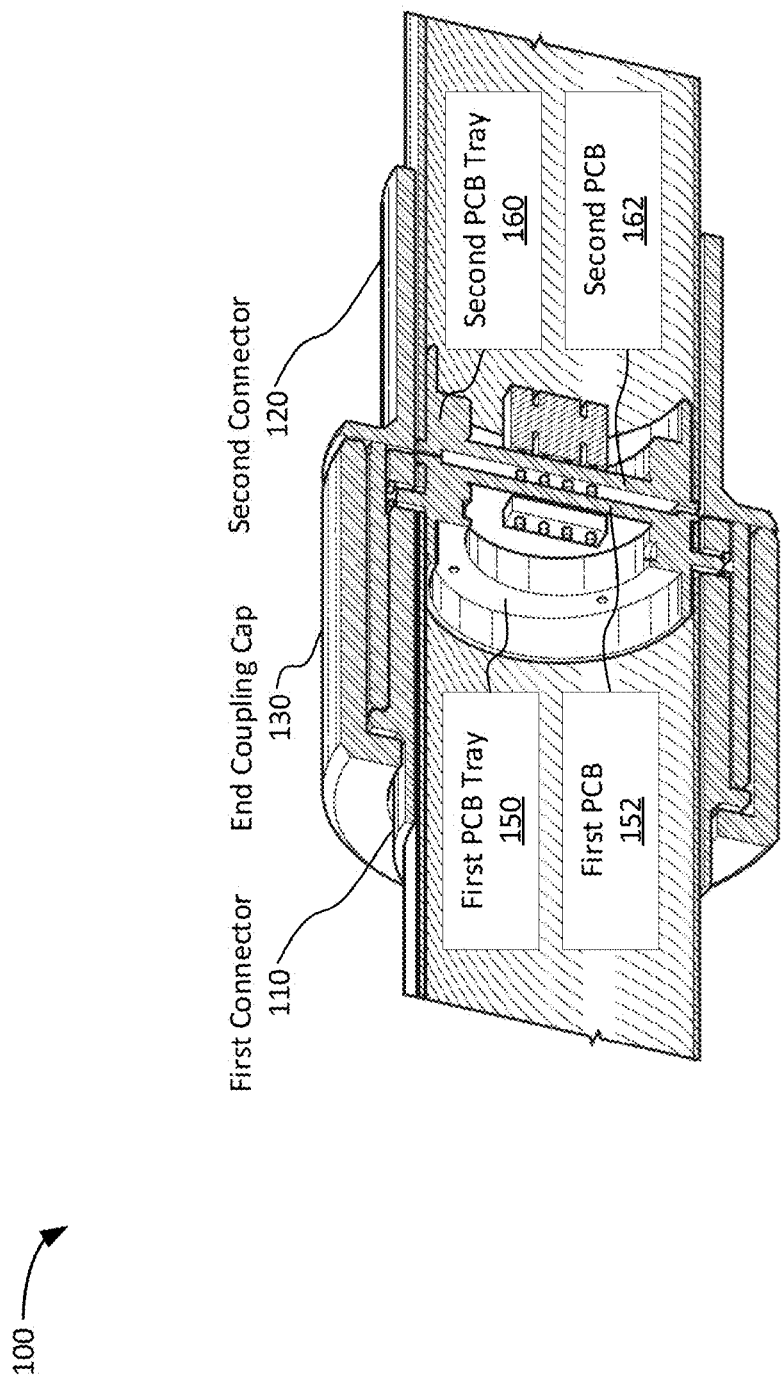

FIGS. 2C-2E illustrate the connection of the pair of electrical connectors 154 and 164, first PCB 152, second PCB 162, with the first connector 110, second connector 120, and end coupling cap 130. In this example, as illustrated in FIG. 2C, the first PCB 152 is connected to the first PCB tray 150 by fastening a plurality of fasteners to secure the first PCB 152 to the first PCB tray 150. The first PCB tray 150 can then be inserted into the first tube 112. Next, the first connector 110 can receive the first tube 112 with the first PCB tray 150 disposed inside the hollow body of the first tube 112. A pair of fasteners can then secure all of the first connector 110, first tube 112, and first PCB tray 150 to each other, which operably connects the first PCB 152 and electrical connector 154 to the first tube 112 such that electrical components can securely connect to the electrical connector 154 without being mixed, rotated relative to each other, cluttered, etc. during operation of the aircraft. Additionally, the second PCB 162 is connected to the second PCB tray 160 by fastening a plurality of fasteners to secure the second PCB 162 to the second PCB tray 160. The second PCB tray 160 can then be inserted into the second tube 122. Next, the second connector 120 can receive the second tube 122 with the second PCB tray 160 disposed inside the hollow body of the second tube 122. A pair of fasteners can then secure all of the second connector 120, second tube 122, and second PCB tray 160 to each other, which operably connects the second PCB 162 and electrical connector 164 to the second tube 122 such that electrical components can securely connect to the electrical connector 164 without being mixed, rotated relative to each other, cluttered, etc. during operation of the aircraft.

As illustrated in FIG. 2D, as the first connector 110 engages the second connector 120, the first PCB 152 and electrical connector 154 will engage with second PCB 162 and electrical connector 162. As illustrated in FIG. 2E, as to lock the first connector 110 with the second connector 120, the end coupling cap 130 can slide towards the second connector, and rotated, to lock each of the first connector 110, second connector 120, and end coupling cap 130 together.

In one example, different types of electrical connectors can be used, disposed and supported by the PCB's, such as electrical connectors 154 and 164, and PCB's 152 and 162, to connect electrical components supported by the first tube 112 to the electrical components supported by the second tube 122. The use of multiple pin connectors for electrical connectors 154 and 164 are only an example and should not be construed as limiting the type of electrical connections that can be used with the PCB's, such as PCB's 152 and 162.

In another example, the first and second PCB 152 and 162 can be of any size, customized to fit securely to any diameter tube. For example, a tube having a one inch diameter can have a PCB, such as first and second PCB 152 and 162 described above, that is also one inch or slightly smaller than one inch to fit inside a PCB tray, such as PCB trays 150 and 160 that is also configured to fit flush with the 1 inch diameter tube. And a tube having a five inch diameter can have a PCB that is also five inches or slightly smaller than five inches to fit inside a PCB tray that is also configured to fit flush with the 5 inch diameter tube.

In one example, the first connector 110, second connector 120, and end coupling cap 130 of the locking apparatus 100 are each comprised of aluminum to secure the first and second tube 112 and 122 such that under flight, vibrations, or forces exerted onto the wings of the aircraft will not move the first and second connector 110 and 120, and that the end coupling cap 130 would not allow dust or other particles to enter one of the tubes such as first tube 112 and second tube 122. In another example, the locking pins 170 will also be hardened steel so that under vibration during flight, the locking pins 170 will continue to stay in place and lock the end coupling cap 130 with the second connector 120.

In one example, while the first tube 112, second tube 122, locking apparatus 100, and electrical members such as the first and second PCB 152 and 162, first and second PCB trays 150 and 160, are each cylindrical shaped, the shape of the cross section of the tubs, connectors, locking apparatus, end coupling cap, and electrical members and components should not be construed as limiting the shape to cylindrical with a circular cross section. In one example, the shapes of the tubes, connectors, end coupling cap, PCB's, and PCB trays can vary, relative to each other, including but not limited to having a rectangular, oval, elliptical, triangular, tapered, jagged, or other annular shaped, symmetrically shaped, or asymmetrically shaped cross section. In this example, the connectors, end coupling cap, PCB's, and PCB trays can have the outer surface and inner surface shaped similar to that of the cross sectional shape of the desired first tube and second tube.

Figure 3:
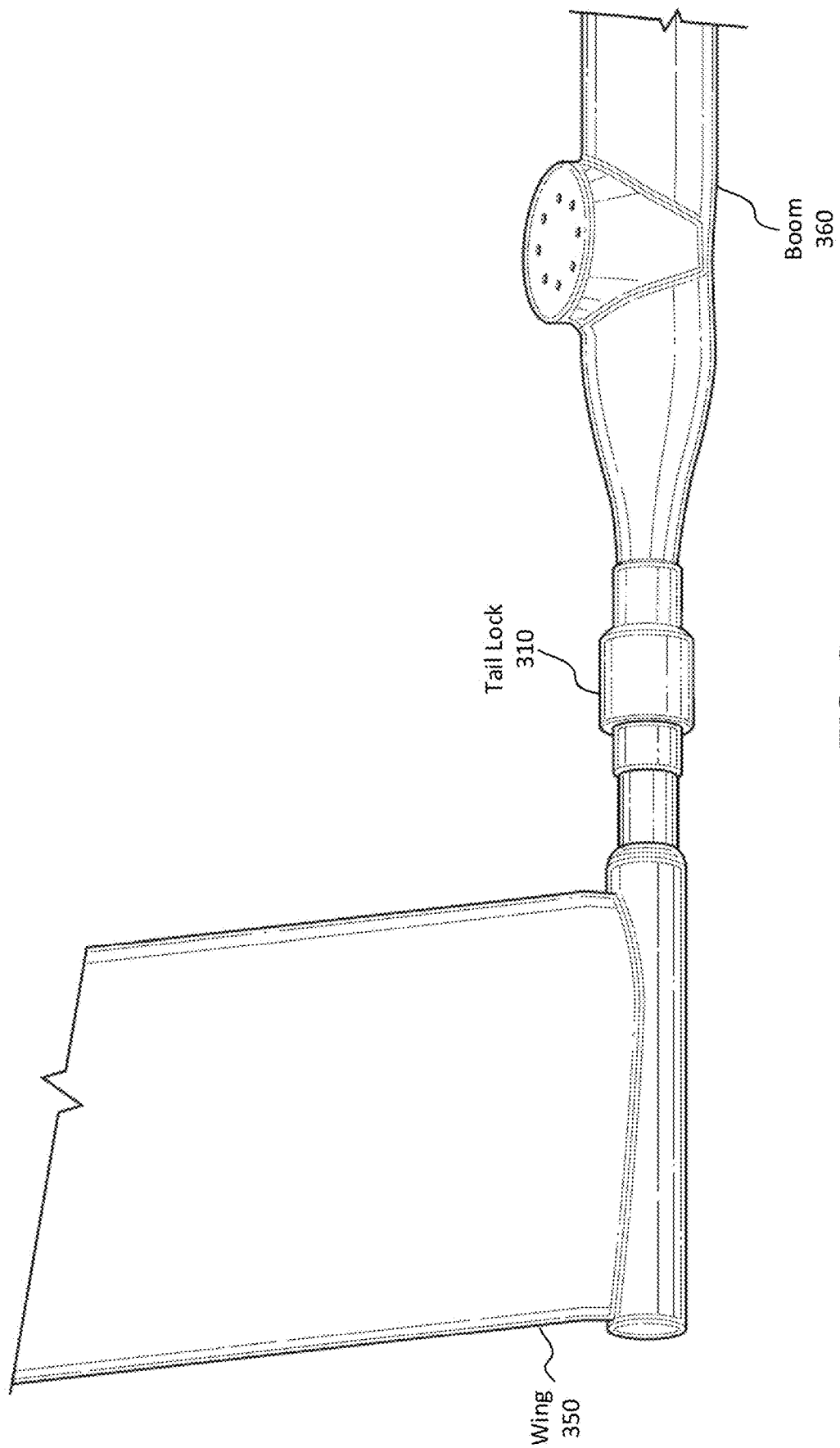
FIG. 3 illustrates an example aircraft system in accordance with various aspects of the subject technology.

FIG. 3 illustrates an example locking apparatus locking together a boom of an aircraft to a wing of the aircraft. In this example, a wing 350, such as a tail wing of an aircraft is connected, securely, to a boom 360 of an aircraft by a locking mechanism or apparatus such as tail lock 310. The tail lock 310 can include a first connector to attach the boom 360, a second connector to attach the wing 350, and an end coupling cap to secure the first connector with the second connector.

Figure 4A:
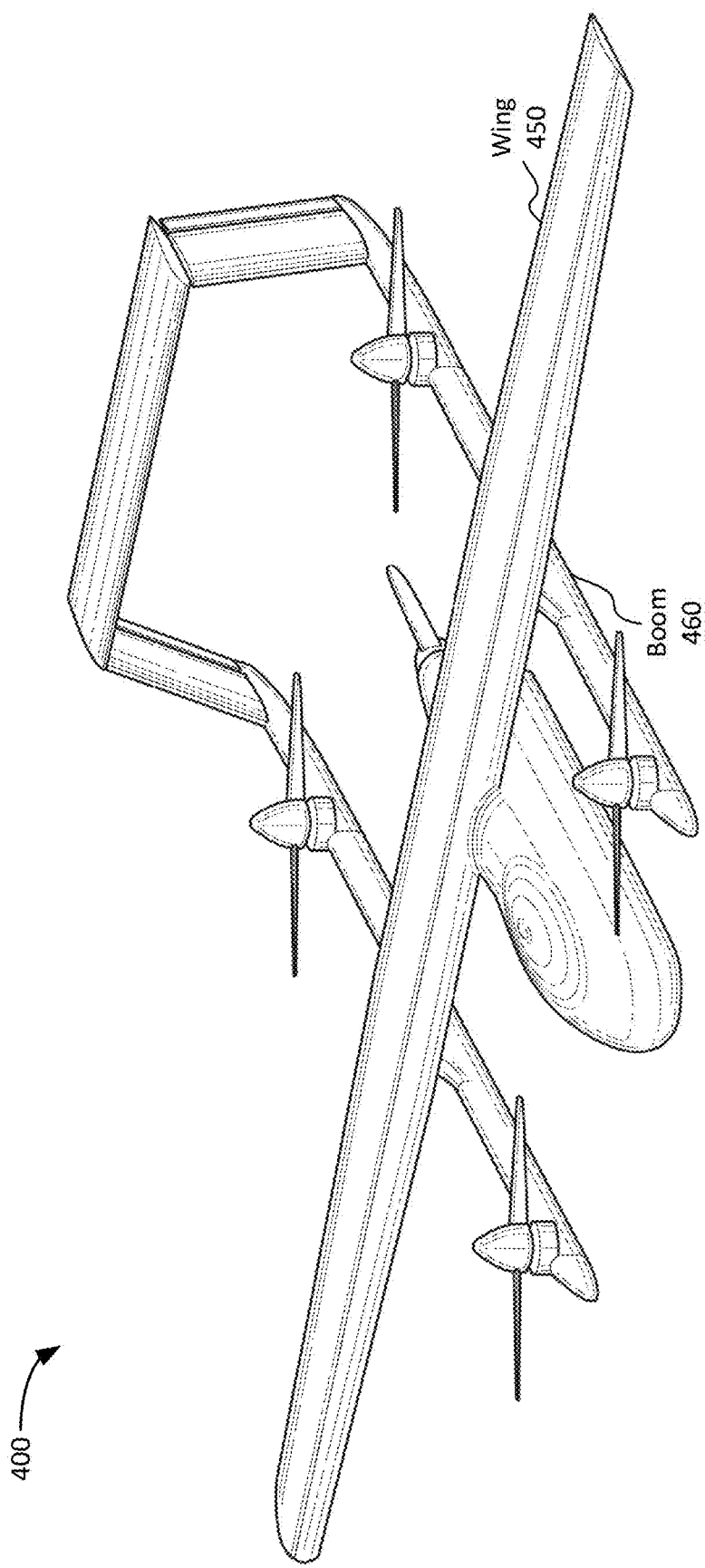
FIGS. 4A-4B illustrate a vehicle in accordance with various aspects of the subject technology.
Figure 4B:
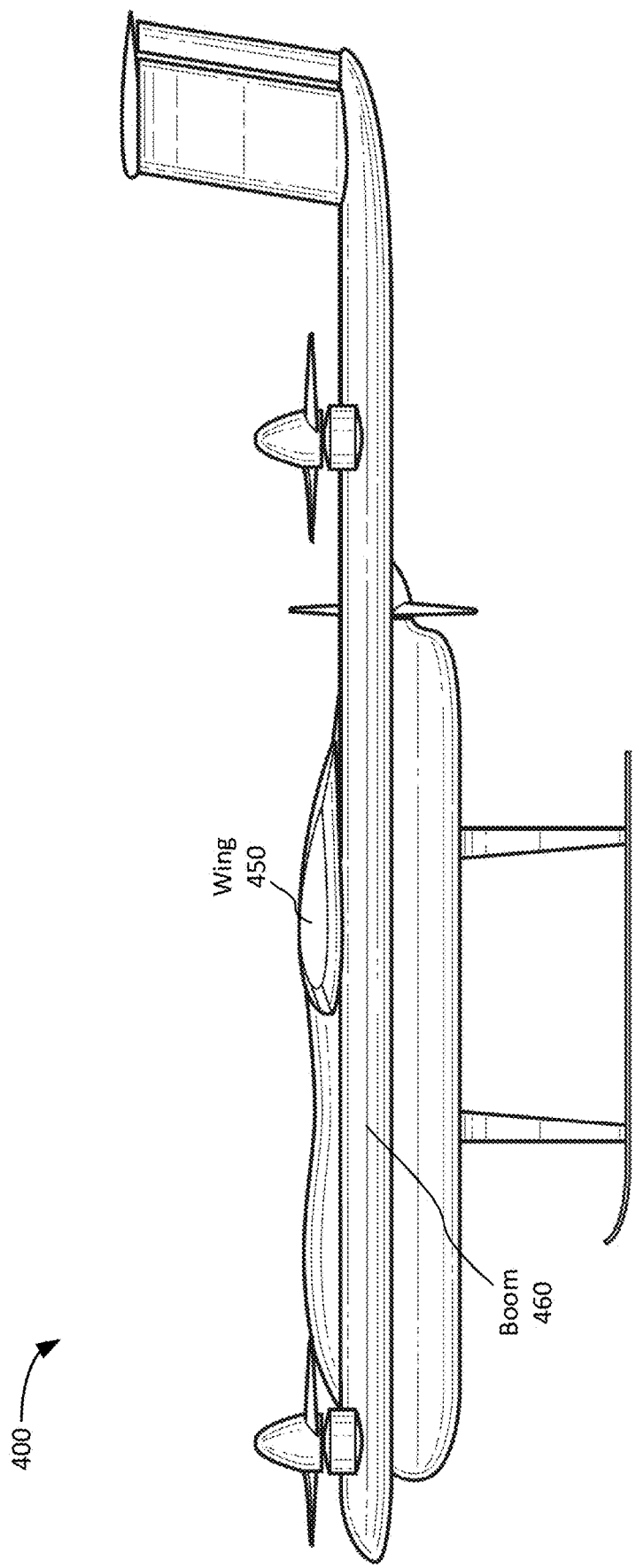

FIG. 4A-4B illustrates example embodiments of a drone. The drone depicted in FIGS. 4A-4B, such as drone 400, is configured with a pair of booms and a tail. In this example, the drone 400 can include a fuselage, a wing 450 that spans across the fuselage perpendicular to a length of the fuselage. Securely suspended beneath the wing 450 are a pair of booms 460. A tail, tail wing, or an additional rear wing of the drone is connected to each of the booms 460 of the drone. In this embodiment, each boom includes a pair of VTOL propellers. One boom 460 is configured to physically connect to a first side of the wing 450 and the second boom 460 is configured to physically connect to a second side of the wing 450. The booms 460 are also connected to each other through a tail wing at each of the rear portions of the booms 460. In this embodiment, the fuselage, wing 450, booms 460, and tail wing can be modular such that each component can be swapped out for a different unit of the same component. In one example, the tail wing can be attached to the drone at the booms of the drone with a locking apparatus. The locking apparatus can be configured to securely attach the tail wing to the boom and configured to be removed from the boom with a quick release mechanism. When fully assembled, as illustrated in FIGS. 4A-B, the drone 400 can include five propellers, four vertically mounted propellers for VTOL and one horizontally mounted propeller for long range flight.

The terminology used herein is for the purpose of describing particular aspects only and is not intended to be limiting of the disclosure. As used herein, the singular forms "a", "an", and "the" are intended to comprise the plural forms as well, unless the context clearly indicates otherwise. It will be further understood that the terms "comprises", "comprising", or a combination thereof, when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described with reference to specific examples thereof, it should be understood that changes in the form and details of the disclosed examples may be made without departing from the scope of the invention. Although various advantages, aspects, and objects of the present disclosure have been discussed herein with reference to various examples, it will be understood that the scope of the disclosure should not be limited by reference to such advantages, aspects, and objects. Rather, the scope of the disclosure should be determined with reference to the claims.

What is claimed is:

1. A locking apparatus, comprising:
   a first connector configured to releasably receive a first tube;
   a second connector having a first side and second side, the first side configured to receive a second tube and the second side configured to releasably receive the first connector; and
   an end coupling cap configured to releasably lock the first connector and second connector together;
   a first PCB tray configured to releasably secure a first PCB and a first electrical connector; and
   a second PCB tray configured to releasably secure a second PCB and second electrical connector, the first electrical connector operably connected to the second electrical connector when the locking apparatus is configured in a locking position.

2. The locking apparatus of claim 1, wherein the first connector includes a shaft, having an inner diameter and outer diameter, and an annular flange.

3. The locking apparatus of claim 2, wherein the annular flange of the first connector has an outer diameter larger than that of the outer diameter of the shaft, the annular flange configured to secure the first connector to the second connector from sliding beyond a desired position.

4. The locking apparatus of claim 1, wherein the first side of the second connector includes a first shaft and the second side of the second connector includes a second shaft, the inner diameter of the first shaft is smaller than that of the inner diameter of the second shaft, an outer diameter of the first shaft is smaller than that of an outer diameter of the second shaft.

5. The locking apparatus of claim 4, wherein the outer diameter of the first shaft is equal to or smaller than that of the inner diameter of the second shaft.

6. The locking apparatus of claim 1, wherein the second connector includes an annular flange separating the first side and second side of the second connector, the annular flange having an outer diameter larger than that of outer diameters of the first side and second side of the second connector.

7. The locking apparatus of claim 6, wherein the annular flange is configured to secure the end coupling cap to the second connector from sliding beyond a desired position when in a locked position.

8. The locking apparatus of claim 1, wherein the end coupling cap includes a hollow body with an inner diameter, the inner diameter equal in length to an outer diameter of the second side of the second connector, such that when the locking apparatus is in a locked position, the second connector receives the first connector and the end coupling cap secures the first connector and the second connector with the end coupling cap.

9. The locking apparatus of claim 8, wherein the end coupling cap further comprises an annular inner lip at one end of the hollow body, the annular inner lip configured to secure the end coupling cap in a desired position when locking the first connector and second connector.

10. The locking apparatus of claim 9, wherein the end coupling cap is prevented from sliding along a longitudinal axis beyond a locking position when locking the first connector and second connector when the annular inner lip is in secure contact with an annular flange of the first connector and an opposite end to the annular inner lip of the hollow body is in secure contact with an annular flange of the second connector.

11. The locking apparatus of claim 1, wherein the end coupling cap includes a rotating lock connection.

12. The locking apparatus of claim 11, wherein the rotating lock connection includes a cutout in the end coupling cap such that a lock pin protruding from an outer surface of the second connector can slide through a first portion of the cutout, rotate about the end coupling cap along a second portion of the cutout, and releasably secure the lock pin with in a groove configured to receive the lock pin.

13. The locking apparatus of claim 12, wherein the end coupling cap is configured to allow a rotation of 30 to 90 degrees relative to the first and second connector.

14. The locking apparatus of claim 12, wherein the end coupling cap includes a magnetized holding pin configured to receive and releasably secure the lock pin.

15. The locking apparatus of claim 1, wherein the first PCB tray is releasably secured to the first connector and the second PCB tray is releasably secured to the second connector.

16. The locking apparatus of claim 1, wherein one or more fasteners secures the first PCB tray, the first connector, and the first tube together.

17. The locking apparatus of claim 1, wherein the locking apparatus locks a wing to a body of an aircraft.

18. The locking apparatus of claim 1, wherein the first tube is operably connected to a body of an aircraft and the second tube is operably connected to a tail flap of the aircraft and the locking apparatus locks the body of the aircraft to the tail flap.

19. The locking apparatus of claim 1 above, wherein the first tube and second tube are comprised of carbon fiber.

20. The locking apparatus of claim 18 above, wherein the first tube is configured to rotate such that the tail flap also rotates about a longitudinal axis of the first tube and second tube.

21. The locking apparatus of claim 1, wherein each of the first connector, second connector, and end coupling cap is comprised of anodized aluminum.

22. The locking apparatus of claim 12, wherein the lock pin is comprised of hardened steel.

23. A locking apparatus, comprising:
   a first connector configured to releasably receive a first tube;
   a second connector having a first side and second side, the first side configured to receive a second tube and the second side configured to releasably receive the first connector; and
   an end coupling cap configured to releasably lock the first connector and second connector together;
   wherein the end coupling cap includes a rotating lock connection and wherein the rotating lock connection includes a cutout in the end coupling cap such that a lock pin protruding from an outer surface of the second connector can slide through a first portion of the cutout, rotate about the end coupling cap along a second portion of the cutout, and releasably secure the lock pin with in a groove configured to receive the lock pin, and wherein the end coupling cap includes a magnetized holding pin configured to receive and releasably secure the lock pin.

24. The locking apparatus of claim 23, wherein the first connector includes a shaft, having an inner diameter and outer diameter, and an annular flange.

25. The locking apparatus of claim 24, wherein the annular flange of the first connector has an outer diameter larger than that of the outer diameter of the shaft, the annular flange configured to secure the first connector to the second connector from sliding beyond a desired position.

26. The locking apparatus of claim 23, wherein the first side of the second connector includes a first shaft and the second side of the second connector includes a second shaft, the inner diameter of the first shaft is smaller than that of the inner diameter of the second shaft, an outer diameter of the first shaft is smaller than that of an outer diameter of the second shaft.

27. The locking apparatus of claim 26, wherein the outer diameter of the first shaft is equal to or smaller than that of the inner diameter of the second shaft.

28. The locking apparatus of claim 23, wherein the second connector includes an annular flange separating the first side and second side of the second connector, the annular flange having an outer diameter larger than that of outer diameters of the first side and second side of the second connector.

29. The locking apparatus of claim 28, wherein the annular flange is configured to secure the end coupling cap to the second connector from sliding beyond a desired position when in a locked position.

30. The locking apparatus of claim 23, wherein the end coupling cap includes a hollow body with an inner diameter, the inner diameter equal in length to an outer diameter of the second side of the second connector, such that when the locking apparatus is in a locked position, the second connector receives the first connector and the end coupling cap secures the first connector and the second connector with the end coupling cap.

31. The locking apparatus of claim 30, wherein the end coupling cap further comprises an annular inner lip at one end of the hollow body, the annular inner lip configured to secure the end coupling cap in a desired position when locking the first connector and second connector.

32. The locking apparatus of claim 31, wherein the end coupling cap is prevented from sliding along a longitudinal axis beyond a locking position when locking the first connector and second connector when the annular inner lip is in secure contact with an annular flange of the first connector and an opposite end to the annular inner lip of the hollow body is in secure contact with an annular flange of the second connector.

33. The locking apparatus of claim 23, wherein the end coupling cap is configured to allow a rotation of 30 to 90 degrees relative to the first and second connector.

34. The locking apparatus of claim 23, wherein the end coupling cap includes a magnetized holding pin configured to receive and releasably secure the lock pin.

35. The locking apparatus of claim 23, further comprising an electrical connection comprising:
 a first PCB tray configured to releasably secure a first PCB and a first electrical connector; and
 a second PCB tray configured to releasably secure a second PCB and second electrical connector, the first electrical connector operably connected to the second electrical connector when the locking apparatus is configured in a locking position.

36. The locking apparatus of claim 35, wherein the first PCB tray is releasably secured to the first connector and the second PCB tray is releasably secured to the second connector.

37. The locking apparatus of claim 35, wherein one or more fasteners secures the first PCB tray, the first connector, and the first tube together.

38. The locking apparatus of claim 23, wherein the locking apparatus locks a wing to a body of an aircraft.

39. The locking apparatus of claim 23, wherein the first tube is operably connected to a body of an aircraft and the second tube is operably connected to a tail flap of the aircraft and the locking apparatus locks the body of the aircraft to the tail flap.

40. The locking apparatus of claim 23, wherein the first tube and second tube are comprised of carbon fiber.

41. The locking apparatus of claim 39, wherein the first tube is configured to rotate such that the tail flap also rotates about a longitudinal axis of the first tube and second tube.

42. The locking apparatus of claim 23, wherein each of the first connector, second connector, and end coupling cap is comprised of anodized aluminum.

43. The locking apparatus of claim 23, wherein the lock pin is comprised of hardened steel.

* * * * *